United States Patent [19]

Kachru et al.

[11] Patent Number: 5,204,770
[45] Date of Patent: Apr. 20, 1993

[54] ALL OPTICAL IMAGE PROCESSING AND PATTERN RECOGNITION APPARATUS USING STIMULATED PHOTON ECHOES

[75] Inventors: Ravinder Kachru, Redwood City; Emily Y. Xu, Mountain View, both of Calif.; Stefan Kroll, Lund, Sweden; David L. Huestis, Menlo Park, Calif.; Myung-Keun Kim, Troy, Mich.

[73] Assignee: Nippon Telegraph and Telephone Corporation, Tokyo, Japan

[21] Appl. No.: 721,459

[22] PCT Filed: Mar. 15, 1990

[86] PCT No.: PCT/US90/01345
§ 371 Date: Jul. 5, 1991
§ 102(e) Date: Jul. 5, 1991

[51] Int. Cl.$^5$ .......... G02F 1/00; G02B 27/46; G06K 9/74; G06E 3/00
[52] U.S. Cl. ........................ 359/264; 359/299; 359/321; 359/560; 359/561; 382/31; 382/42; 365/119
[58] Field of Search ............ 359/4, 7, 264, 299, 359/300, 321, 29, 559, 560, 561; 382/31, 42; 365/119, 215, 216

[56] References Cited

U.S. PATENT DOCUMENTS

| | | | |
|---|---|---|---|
| 3,638,029 | 1/1972 | Hartmann et al. | 365/119 X |
| 3,766,498 | 10/1973 | Brewer et al. | 359/264 |
| 4,321,550 | 3/1982 | Evtuhov | 359/300 X |
| 4,479,199 | 10/1984 | Friedlander et al. | 365/119 |
| 4,640,618 | 2/1987 | Tracy et al. | 356/345 |
| 4,726,639 | 2/1988 | Brody | 359/7 |
| 4,739,496 | 4/1988 | Marom et al. | 365/125 |
| 4,750,153 | 6/1988 | Owechko et al. | 365/125 |
| 4,767,195 | 8/1988 | Pepper | 372/21 X |
| 4,948,212 | 8/1990 | Cheng et al. | 359/7 |

Primary Examiner—Bruce Y. Arnold
Assistant Examiner—David R. Parsons
Attorney, Agent, or Firm—Spencer, Frank & Schneider

[57] ABSTRACT

An image processing apparatus having a third-order nonlinear stimulated photon echo medium (1). The photon echo medium (1) can store large numbers of images in the form of a Fourier transformed pattern by spectral modulation. The spectral modulation is carried out by sending optical pulses in an optical pulse train having (or not having) image information to the medium (1) so that the population in the ground and excited states are modulated after the passage of the pulse trains and pulses. The Fourier transformed pattern is converted back to temporal modulation, consisting of a sequence of echo pulses that reproduce the original data pulse train. By using the apparatus, ultrafast operation such as convolution and correlation between a number of reference images and a test image can be achieved.

8 Claims, 8 Drawing Sheets

|  | B1 | B2 | B3 | Be |
|---|---|---|---|---|
| FIG. 8A |  |  PLANE WAVE |  PLANE WAVE |  |
| FIG. 8B |  |  | PLANE WAVE |  |
| FIG. 8C | 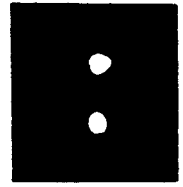 |  PLANE WAVE | 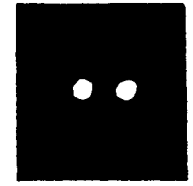 | 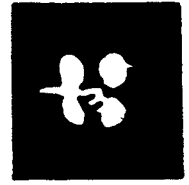 |
| FIG. 8D | 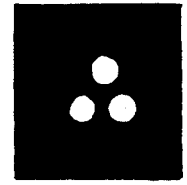 | 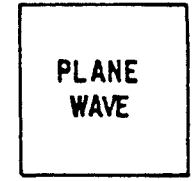 PLANE WAVE | 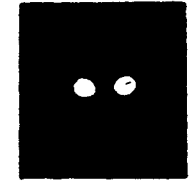 | 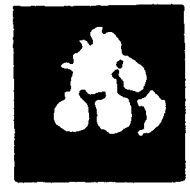 |
| FIG. 8E | 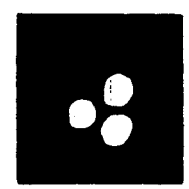 | 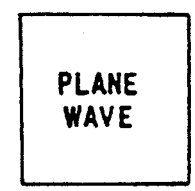 PLANE WAVE | 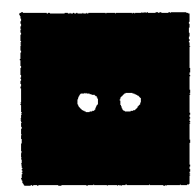 | 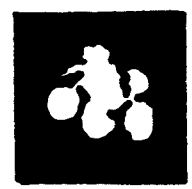 |

ALL OPTICAL IMAGE PROCESSING AND PATTERN RECOGNITION APPARATUS USING STIMULATED PHOTON ECHOES

BACKGROUND OF THE INVENTION

1. Technical Field

The present invention relates to an optical, high-speed image processing apparatus, and more particularly to an all optical image processing and pattern recognition apparatus using stimulated photon echoes, which can process quickly a number of pieces of image information in real time.

2 Background Art

High-speed real time processing of two-dimensional images has a variety of applications in which large numbers of images must be stored and analyzed. These include robotic vision, satellite remote sensing, medical image analysis, artificial intelligence and pattern recognition. Optical image processing is promising for two principal reasons: parallel processing capability and potentially ultrafast speed. Among the existing techniques for two-dimensional image processing is a stimulated photon echo technique in conjunction with optical Fourier transformation.

(1) Stimulated Photon Echo

Stimulated photon echo is achieved when optical pulses are sequentially incident into a stimulated photon echo medium, the line shape function (absorption characteristic) of which is illustrated in FIG. 2. FIG. 2 shows that a photon echo medium (a rare earth ion doped dielectric crystal) includes many atoms having a narrow homogeneous broadening $\Delta\nu_H$, and such atoms integrally constitute an inhomogeneous broadening $\Delta\nu_{IH}$. When optical pulses P1, P2 and P3 (see FIGS. 1 and 3), the energy of which is within the stable absorption range corresponding to the inhomogeneous broadening are incident into such a medium at time $t_1$, $t_2$ and $t_3$, respectively, a photon echo Pe occurs at time $t_4$ subsequent to the time $t_3$ (see FIG. 3).

Time $t_4$ which the photon echo Pe occurs, is $\Delta t$ ($=t_2-t_1$) after $t_3$, and hence, $t_4-t_3=t_2-t_1$. The width $\Delta\tau$ of the pulses incident to the photon echo medium has the following relationship with the inhomogeneous broadening $\Delta\nu_{IH}$ and the homogeneous broadening $\Delta\nu_H$:

$$1/\Delta\nu_{IH} < \Delta\tau < 1/\Delta\nu_H. \tag{1}$$

The optical pulse P2 must be incident within time $T_2$ ($T_2=1/\Delta\nu_H$) after the incident of the optical pulse P1. The time $T_2$ is the coherence-decay time of absorption transition during which the photon echo medium keeps coherency of the incident light. On the other hand, the optical pulse P3 must be incident within time $T_1$ after the incidence of the optical pulse P2. The time $T_1$ is the population-decay time of the absorption transition in which the photon echo medium returns to its thermal equilibrium state. Thus, the incident time of the optical pulses P1 to P3 must satisfy the relationship $$t_2-t_1 < T_2,\ t_3-t_2 < T_1. \tag{2}$$

In general, $T_1 \gg T_2$, and the optical pulse P2 is stored in the photon echo medium during the population-decay time $T_1$.

In this condition, time quadrature $\theta e$ of the amplitude of the photon echo pulse Pe is given by the following equation when the incident pulse intensity is weak:

$$\theta e = \mu / \int \epsilon(t)dt \propto \theta_1, \theta_2, \theta_3, \tag{3}$$

where $\theta i = \mu/h \int \epsilon_i(t)dt$ ($i=1\sim3$), $\epsilon$ and $\epsilon_i$ are the electric fields of respective optical pulses, and $\mu$ is the electric dipole moment of the ion in the photon echo medium. The intensity of the photon echo pulse Pe is proportional to the product of the incident pulses P1, P2 and P3 because the photon echo occurs in the third-order nonlinear interaction. Furthermore, it is seen that the optical echo signal the waveform of which is similar to that of the optical pulse P2 can be obtained when the optical pulses P1 and P3 are similar to the delta function having no image information. Thus, the photon echo pulse similar to the optical pulse P2 stored in the photon echo medium can be read out at time $t_4$. The optical pulses P1, P2 and P3, and the echo pulse Pe must satisfy the phase-matching condition (momentum conservation equation) expressed by $$-K_1+K_2+K_3-K_e=0 \tag{4}$$

where $K_i$ ($i=1, 2$ or $3$) and $K_e$ are wave-number vectors of respective pulses. The echo pulse Pe takes place in the direction to satisfy the phase-matching condition.

Examples of media having a wide inhomogeneous broadening of the absorption transition are shown in FIG. 4 and the following Table:

TABLE

Population-decay time ($T_1$) and coherence-decay time ($T_2$) for rare earth ion doped materials

| Material | Transition | $\lambda$(Å) | $T_1$ | $T_2$ | Ref. |
|---|---|---|---|---|---|
| $Pr^{3+}$:LaF$_3$ | $^1D_2-^3H_4$ | 5925 | 500 μs | 6 μs | a) |
| | $^3P_0-^3H_4$ | 4778 | 75 μs | 2.4 μs | c) |
| $Pr^{3+}$:YAlO$_3$ | $^1D_2-^3H_4$ | 6105 | 180 μs | 35 μs | a) |
| $Pr^{3+}$:CaF$_3$ | $^1D_2-^3H_4$ | 5941 | 506 μs | 720 ns | d) |
| $Pr^{3+}$:LaCl$_3$ | $^1D_2-^3H_4$ | 6011 | 195 μs | .81 μs | e) |
| $Pr^{3+}$:LaBr$_3$ | $^1D_2-^3H_4$ | 6033 | 162 μs | | e) |
| $Pr^{3+}$:YAG | $^1D_2-^3H_4$ | 6096 | 230 μs | 20 μs | f) |
| | $^3P_0-^3H_4$ | 4870 | | 3 μs | g) |
| $Eu^{3+}$:YAlO$_3$ | $^5D_0-^7F_0$ | 5816 | 3 ms | 58 μs | h) |
| $Eu^{3+}$:Y$_2$O$_3$ | $^5D_0-^7F_0$ | 5808 | 860 μs | 419 μs | i) |
| $Eu^{3+}$:CaF$_2$ | $^5D_0-^7H_0$ | 5736 | 1.8 ms | | j) |
| $Nd^{3+}$:LaF$_3$ | $^4F_{3/2}-^4I_{9/2}$ | 8626 | | .12 μs | g) |
| | $^4G_{7/2}-^4I_{9/2}$ | 5221 | | | g) |
| $Nd^{3+}$:YAG | $^4F_{3/2}-^4I_{9/2}$ | 8749 | | .09 μs | g) |
| $Sm^{3+}$:LaF$_3$ | $^4G_{5/2}-^6H_{5/2}$ | 5598 | 7.7 ms | 110 ns | k) |
| $Er^{3+}$:LaF$_3$ | $^4S_{3/2}-^4I_{15/2}$ | 5388 | 1.2 ms | 12 ns | l) |
| $Ho^{3+}$:LaF$_3$ | $^5S_2-^5I_8$ | 5376 | .93 ms | .66 μs | |
| | | 5375 | | .67 μs | |
| | $^5F_5-^5I_8$ | 6411 | .55 ms | .38 μs | | a) Macfarlane et al., Phys. Rev. Lett. 43, 1726 (1979).
b) Rand et al., Phys. Rev. Lett. 43, 1868 (1979).
c) Chen et al., Phys. Rev. B21, 40 (1980).
d) Macfarlane et al., Phys. Rev. B29, 2390 (1984).
e) Genack et al., Phys. Rev. Lett. 45, 438 (1980).
f) Shelby et al., Opt. Lett. 8, 304 (1983).
g) Kachru et al., Private communication.
h) Shelby et al., Phys. Rev. Lett. 45, 1098 (1980).
i) Macfarlane et al., Opt. Commun. 39, 169 (1981).
j) Gustafson et al., Anal. Chem. 51, 1762 (1979).
k) Macfarlane et al., Phys. Lett. A116, 299 (1986).
l) Macfarlane et al., Opt. Commun. 42, 346 (1982).

FIG. 4 is an energy-level diagram of $Pr^{3+}$ ion doped into a dielectric crystal LaF$_3$, and the Table is a list of decay characteristics of various rare earth ion doped materials. As seen from the Table, decay times corresponding to typical absorption transitions greatly differ according to the host crystal into which rare earth ions are doped even if the rare earth ion is identical. The coherence-decay time $T_2$ in a solid has a large temperature dependence, and is very short at room temperature (less than $10^{-13}$ sec.). The population-decay time $T_1$ is no more than several milliseconds. However, at an ultra-low temperature, the information is stored in the ground state hyperfilm levels as non-thermal population modulation which can last up to many hours.

For example, decay times of Eu: $YAlO_3$ absorption transition ($^7F_0-^5D_0$ transition; wavelength of 581.6 nm) are as follows: coherence-decay time $T_2$ at 6K is 58 $\mu s$, population-decay time $T_1$ is 3 ms, and population-decay decay time in the ground state hyperfine levels is approximately 3.8 hours. The inhomogeneous broadening is approximately 10 GHz. Consequently, the narrowest optical pulse width is approximately 100 ps, and about $10^5$ pulses (bits) can be incident into the photo echo medium during the coherence-decay time $T_2$. These pulses can be stored nearly 4 hours.

Similar photon echoes can be observed when one or more optical pulses P1-P3 are analog optical signals including two-dimensional image information. For example, the optical pulse P2 including two-dimensional image information can be stored in the photon echo medium during the population-decay time $T_1$, and can be retrieved by the incidence of the optical pulse P3.

(2) Fourier processing of the optical signal

FIG. 5 shows a Fourier processing system for the optical signal using a third-order nonlinear medium. A pair of lenses $L_1$ and $L_2$ of focal length f are placed on either side of the third-order nonlinear medium S, the distance from each lens to the medium being f. As shown in FIG. 5, images $E_1$, $E_2$ and $E_3$ are located in the outer focal planes of the lenses, respectively. These images are irradiated by laser beams, the angular frequency of which is $\omega$. The images $E_1$, $E_2$ and $E_3$ are expressed by $$E_i = \tfrac{1}{2} A_i(x,y,z)\exp(i(kz-\omega t)) + c.c. (i=1\sim 3) \qquad (5)$$

where $A_i$ is the amplitude of the image $E_i$, k is a wave number vector of $E_i$ (i=1, 2 or 3), and c.c. is an acronym for "complex conjugate". Here, the origin of the z-axis is defined at the leftmost point as shown in FIG. 5, and $u_1$, $u_2$ and $u_3$ are defined as follows:

$$A_{1,3}(x,y,0) = u_{1,3}(x,y), \quad A_2(x,y,4f) = u_2(x,y) \qquad (6)$$

The angular frequencies of the incident beams are identical. The amplitude of $A_1$ transmitted through lens $L_1$ is subjected to Fourier transform in the Fresnel approximation and is expressed by $$A_1(x,y; f \le z \le 3f) = \frac{\exp(ikn\Delta)\exp(ikz)}{i\lambda f} \cdot$$

$$F\left\{ u_i(x',y')\exp\left[\frac{ik}{2f}\left(2-\frac{z}{f}\right)(x'^2+y'^2)\right]\right\} \qquad (7)$$

where $\exp(ikn\Delta)\exp(-ik(x^2+y^2/2f))$ is the transfer function of the lens $L_1$, and "F" represents the Fourier transform. At the focal plane of the lens we have $Z=2f$ in which case equation (7) simplifies and shows that the lens takes a perfect Fourier transformation. Similarly, $A_2$ and $A_3$ are transformed by the Fourier transform lenses $L_1$ and $L_2$. When the optical images thus transformed are incident into the photon echo medium S, nonlinear polarization $Pn_L$ occurs and is expressed by $$Pn_L = \chi_{ijkL}^{(3)} A_{1j} A_{2K} A_{3L}^* \qquad (8)$$

where $\chi_{ijkL}^{(3)}$ is a third-order tensor representing nonlinear optical susceptibility. Optical signal $A_4$ produced by the nonlinear polarization counterpropagates with respect to $E_3$ to satisfy conservation of energy and phase-matching condition (conservation of momentum) corresponding to the third-order nonlinear interaction. The $A_4$ wave at $z=0$ is expressed by $$A_4(x_0, y_0, 0) = Cu_1(-x, -y)*u_2(x,y)\cdot u_3(-x, -y) \qquad (9)$$

where C is a constant of proportionally determined by a nonlinear coefficient, "*" represents a convolution, and "." represents a correlation. It is seen from the above relationship that when $u_3$ is a point source, $A_4$ is a convolution image of $u_1$ and $u_2$, and when $u_1$ is a point source, $A_4$ is a correlation image of $u_2$ and $u_3$. Thus, the Fourier optical system shown in FIG. 5 can achieve various image processings by using a third-order nonlinear medium S.

In this case, the maximum spatial frequency can be obtained as follows. First, the maximum spatial frequency fms in the Fresnel approximation is given by $$fms < (4/\pi\lambda^3 f)^{1/4} \qquad (10)$$

The upper limit of the input field spot size d is given by $$d < (4\lambda f^3/\pi)^{\frac{1}{4}} \qquad (11)$$

Hence, the maximum resolution Nmax is derived through the above two equations, yielding $$Nmax = 16 f/\pi\lambda \qquad (12)$$

When the focal length is 10 cm and the wavelength $\lambda$ is 0.5 $\mu m$, the maximum spatial frequency is $10^3$ cm$^{-1}$, which is sufficient for image processing.

SUMMARY OF THE INVENTION

In the above technique, each input pulse P1, P2, and P3 of the photon echo system presents a single image, and therefore, it is impossible to achieve Fourier image processing between more than three images by a single photon echo processing. This hinders high-speed processing necessary for industrial applications where a number of matching processings are required between a test image to be analyzed and many reference images.

Therefore, the object of the present invention is to provide an optical image processing apparatus which can carry out image processing such as correlation processing between a test image and many reference images by an optical Fourier transform using a third-order nonlinear medium.

To accomplish this object, the present invention combines the stimulated photon echo and Fourier image processing using a third-order nonlinear medium, being provided with a multiple image storing function by using a pulse train including a series of optical pulses instead of the first pulse P1 or the second pulse P2.

More specifically, the present invention provides all optical image processing and pattern recognition apparatus using stimulated photon echoes comprising: a stimulated photon echo medium having an inhomogeneous broadening line shape function; first incident means for launching a first optical pulse into the photon echo medium; second incident means for launching a second optical pulse train including two or more optical pulses into the photon echo medium from a direction different from the incident direction of the first optical pulse in the coherence-delay time of the photon echo medium after the incidence of the first optical pulse; third incident means for launching a third optical pulse into the photon echo medium in the population-decay time of the photon echo medium after the incidence of the second optical pulse train, the population-decay time being defined as time during which the medium returns to its thermal equilibrium state from its excited state; and optical detecting means for detecting photon echoes emitted from the photon echo medium, wherein the second optical pulse train includes a plurality of pieces of image information.

Furthermore, the present invention provides all optical image processing and pattern recognition apparatus using stimulated photon echoes comprising: a stimulated photon echo medium having an inhomogeneous broadening line shape function; first incident means for launching a first optical pulse train including two or more optical pulses into the photon echo medium; second incident means for launching a second optical pulse into the photon echo medium from a direction of the first optical pulse train in the coherence-decay time of the photon echo medium after the incidence of the first optical pulse train; third incident means for launching a third optical pulse into the photon echo medium in the population-decay time of the photon echo medium after the incidence of the second optical pulse, the population-decay time being defined as the time during which the medium returns to its thermal equilibrium state from its excited state; and optical detecting means for detecting photon echoes emitted from the photon echo medium, wherein the first optical pulse train includes a plurality of pieces of image information.

In the preceding explanation of the stimulated photon echoes, each of the first and second optical pulses P1 and P2 is a single pulse. The present invention, however, uses a pulse train consisting of a series of pulses or an analog optical waveform as a second input instead of the second pulse P2 to generate a series of echo pulses or an analog optical waveform similar to the second input.

Alternatively, a pulse train can be used instead of the first input pulse P1 because the first and the second pulses have similar effect. In this case, however, the resultant photon echoes have time reversed waveform as is understood from the principle of the stimulated photon echoes.

Thus, the apparatus of the present invention has functions for storing and retrieving optical information. The storing capacity C of the apparatus is determined by the number of optical pulses that can be incident in the coherence-decay time $T_2$. Since the narrowest width of the optical pulse is $\Delta\tau$, $$C = \Delta\nu_{IH}/\Delta\nu_H \qquad (13)$$

The memory span, on the other hand, is determined by the population-decay time $T_1$.

BRIEF DESCRIPTION OF THE DRAWINGS

These and other objects of the present invention, together with the features and advantages thereof, will become apparent from the following description, when considered in conjunction with the accompanying drawings.

PREFERRED EMBODIMENTS OF THE INVENTION

Figure 1:
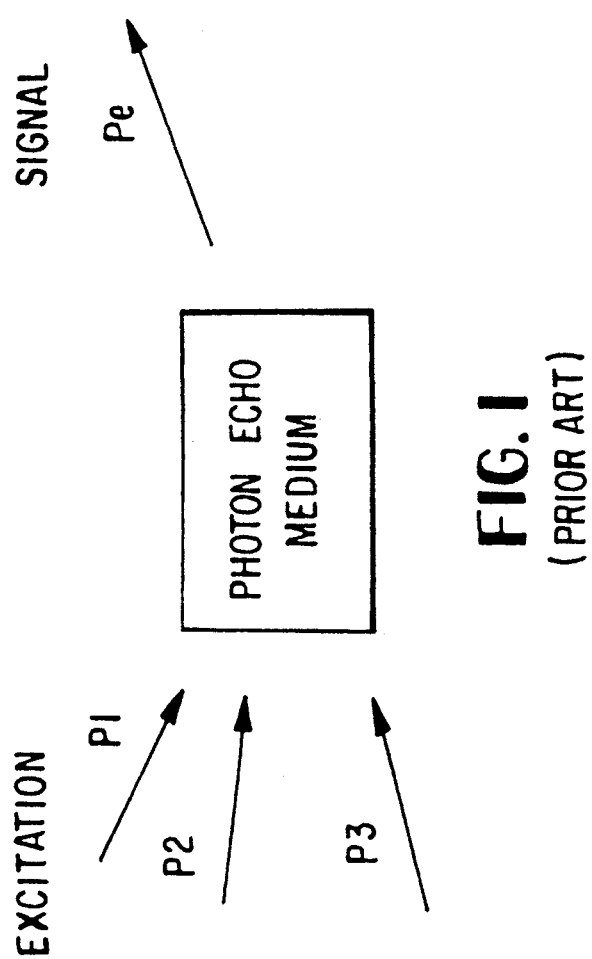
FIG. 1 is a schematic view for explaining stimulated photon echo.
Figure 2:
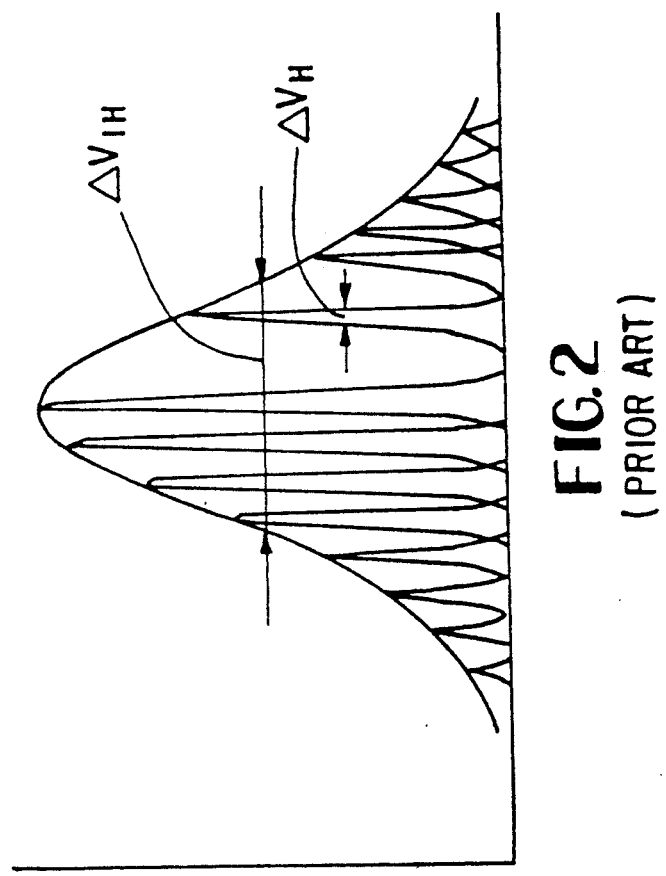
FIG. 2 is a graph illustrating the line shape function (absorption spectrum) of a stimulated photon echo medium.
Figure 3:
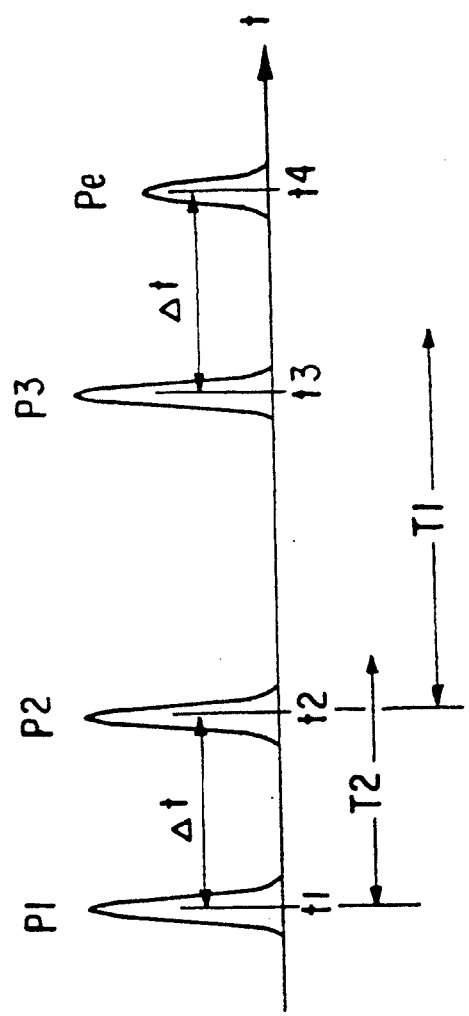
FIG. 3 is a waveform chart for explaining stimulated photon echo.
Figure 4:
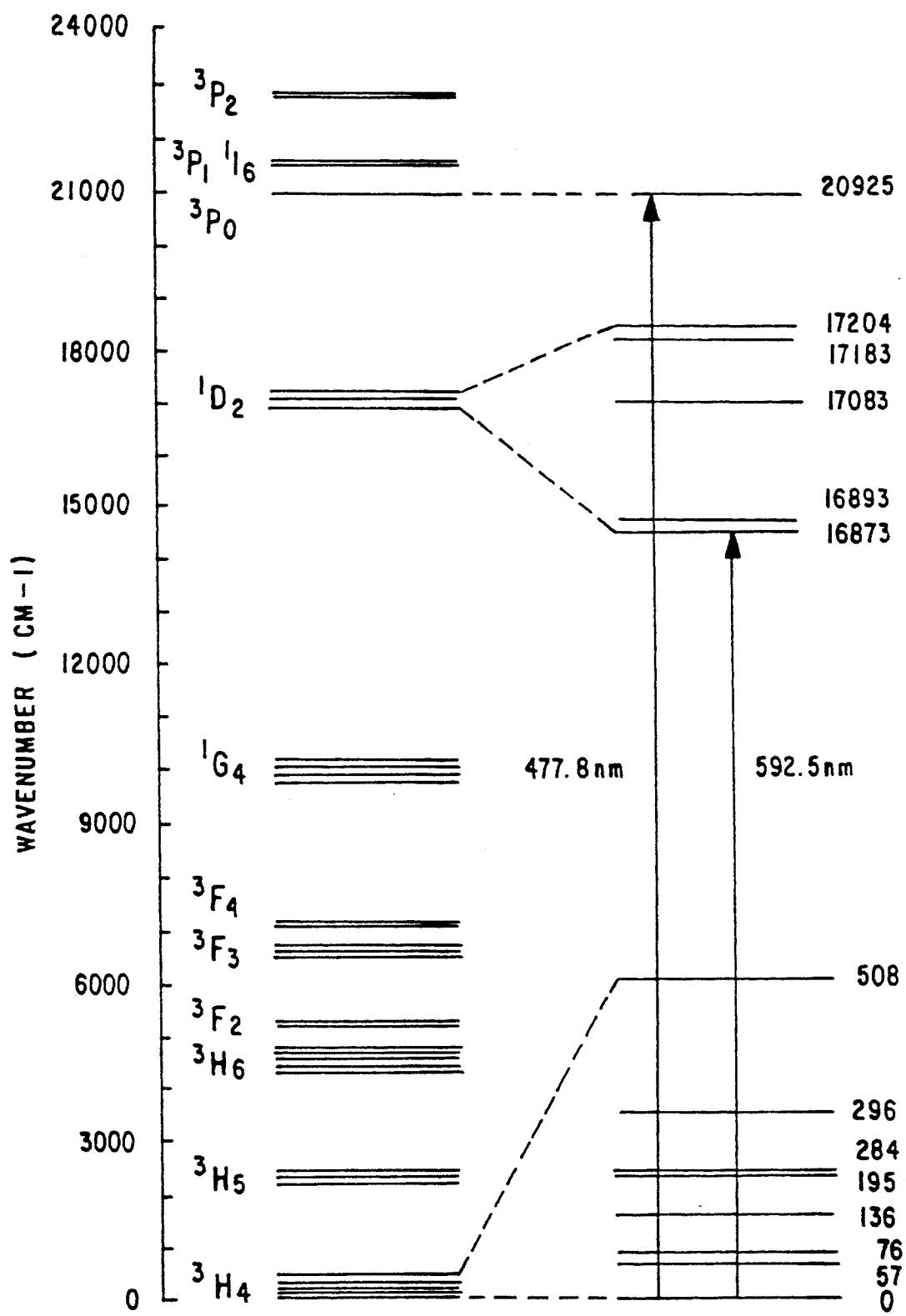
FIG. 4 is an energy level diagram for a stimulated photon echo medium.
Figure 5:
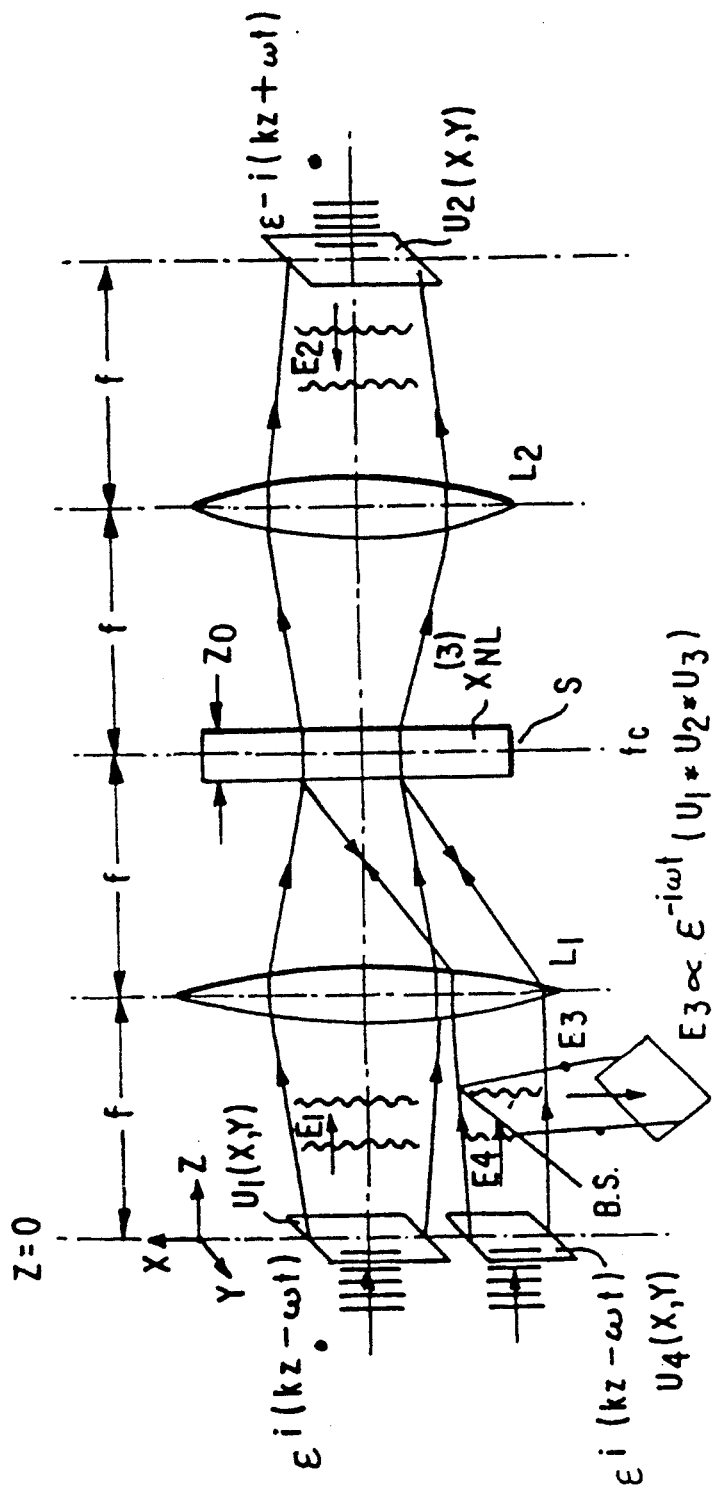
FIG. 5 is a schematic diagram illustrating optical Fourier processing.
Figure 6:
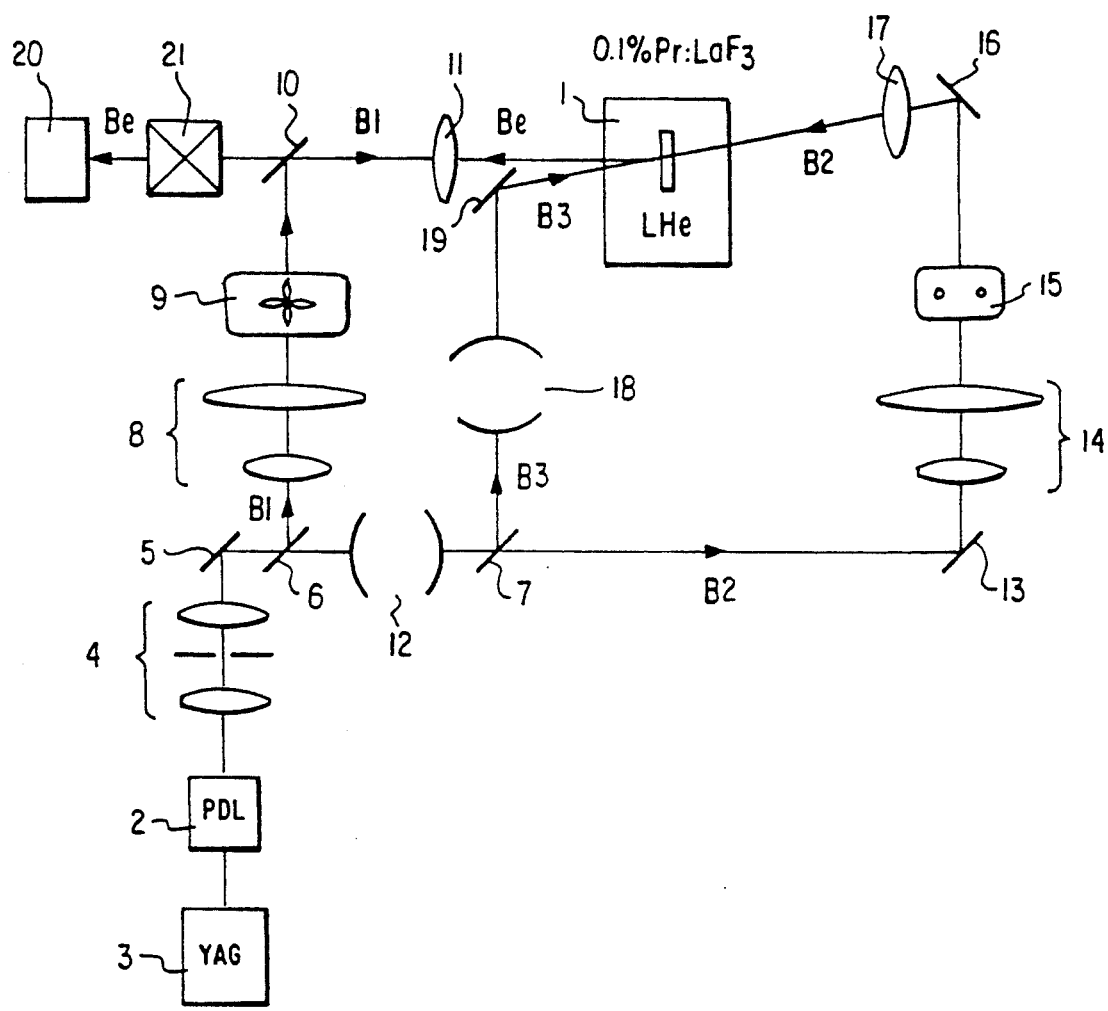
FIG. 6 is a block diagram showing an embodiment of the stimulated photon echo image processing apparatus according to the present invention.

FIG. 6 shows an arrangement of an embodiment of the stimulated photon echo image processing apparatus of the present invention, which performs the image processing between a first image and the third or second image by the stimulated photon echo. In FIG. 6, a rare earth doped crystal 1 (0.1% $Pr^{3+}$: $LaF_3$) cooled by liquid helium is used as a stimulated photon echo medium. The crystal 1 exhibits the $^3P_0$—$^3H_4$ absorption transition (wavelength of 477.8 nm), for which a pulsed dye laser 2 with 2 GHz linewidth is tuned. The crystal 1 (photon echo medium) can store large numbers of images in the form of a Fourier transformed pattern by spectral modulation. The spectral modulation is carried out by sending optical pulses and an optical pulse train having (or not having) image information to the medium so that the population in the ground and excited states are modulated after the passage of the pulse train and pulses.

The pulsed dye laser 2 is pumped by the third harmonic of a YAG laser 3. The beam from the pulsed dye laser 2 is transmitted through a spatial filter 4 which is used to improve the spatial beam profile of the laser beam, and is reflected by a mirror 5. Two beam splitters 6 and 7 divide the laser beam into three beams B1, B2, and B3.

The first beam B1 is expanded by a collimator 8 to illuminate uniformly the entire pattern of a first mask 9 uniformly. The first mask 9 is made of thin aluminum plates with small holes. The pattern was cut on aluminum foil, which was then attached to a microscope slide. The first beam B1 passing through the first mask 9 is called the first image and is reflected by a beam splitter 10, and is focused by a Fourier-transform lens 11 into the crystal 1. The first mask 9 and the Fourier-transform lens 11 are f apart, the f being the focal length of the Fourier transform lens 11. Large numbers of first images can be generated in the coherence-decay $T_2$ of the crystal 1 by using a spatial modulator (not shown). The coherence-decay time $T_2$ for the crystal 1 is about 2.4 μsec as seen from the Table and the first images must be sequentially switched in the time $T_2$. An example of a device satisfying such a condition is a spatial light modulator (SLM) described in SPIE Proc. Vol. 634, 352–371 (1986). Increasing number of first images can be processed by using an SLM having a faster switching operation The second beam B2, which is split by the beam splitter 6, optically delayed by $\Delta t_1$ through an optical delay line 12, split by the beam splitter 7, and is reflected by a mirror 13, is expanded by a collimator 14 to illuminate uniformly the entire pattern of a second mask 15. The second beam B2, encoded with the second pattern 15 and reflected by a mirror 16, is focused by another Fourier-transform lens 17, entering the crystal 1 from the opposite direction with regard to the beam B1. The two lenses 11 and 17 share a common focal plane.

The third beam B3, which is split by the beam splitter 6, delayed by the optical delay line 12, and further split by the beam splitter 7, is delayed by $(\Delta t_2 - \Delta t_1)$ by an optical delay line 18, and is reflected by the mirror 19, thus counterpropagating with respect to the second beam B2.

The echo image Be emitted $\Delta t$ later than the incidence of the third beam B3 (see FIG. 7), counterpropagates with respect to the first beam B1 and is detected by an optical detector 20 separated by the focal length f from the lens 11. The detector 20 is, for example, a vidicon camera or optical detecting array. Between the optical detector 20 and the beam splitter 10, is provided a Pockels cell 21 which functions as an optical shutter that transmits the echo while blocking scattered light from the input pulses. The echo image Be is the phase conjugate of the first image B1.

When the third beam B3 is a plane wave, spatial convolution operation between the first image B1 and the second image B2 is achieved. To perform the convolution correctly, the thickness of the crystal 1 has to be within the "good focal plane" of the lenses 11 and 17, defined as the depth of focus of the lens, where the intensity distribution is a faithful Fourier transform of the original image. This thickness is given as $Z_0 << \lambda f^2/(\pi d^2)$ where f is the focal length and d is the beam aperture diameter. In this case, $Z_0$ is 1.5 mm, and the crystal 1 was cut to less than a 1 mm thickness to avoid this length aberration.

Figure 7:
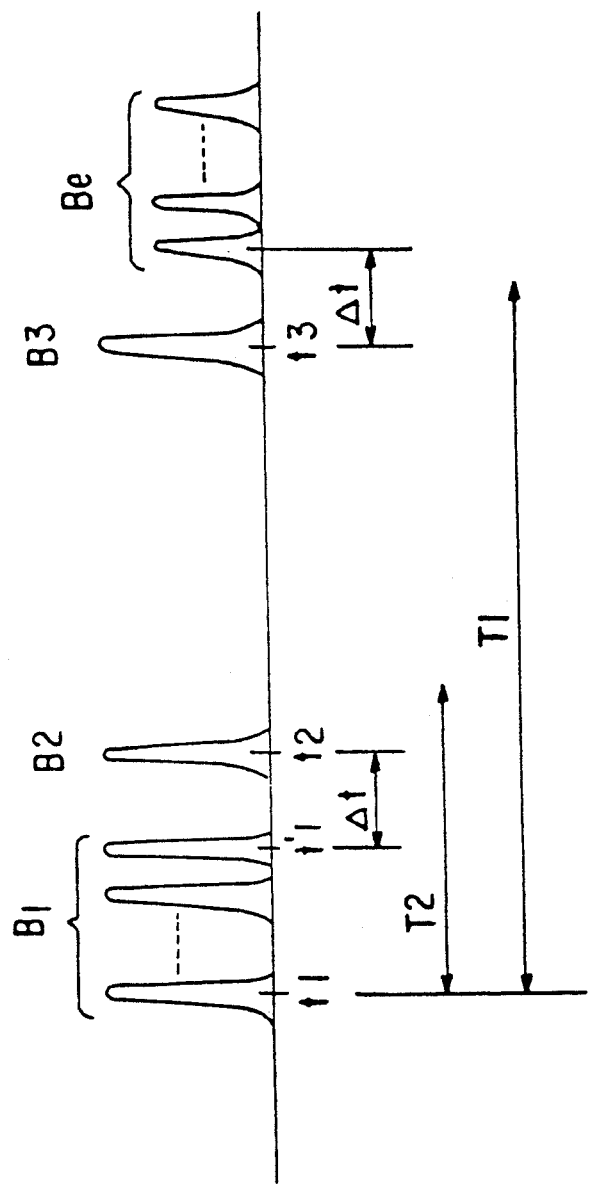
FIG. 7 is a waveform chart for explaining stimulated photon echo in the apparatus of the embodiment; and FIGS. A-8E are views of resultant images of the image processing according to the embodiment.

In another configuration, the third beam B3 carries the spatial image while the second beam B2 is a plane wave (to achieve this, the collimator 14 and the second mask 15 in FIG. 6 must be placed between the mirror 19 and the crystal 1). In this case, the photon echo image Be is the correlation between the first image B1 and the third image B3. This makes it possible to test the agreement of the two images B1 and B3. Accordingly, ultrafast pattern matching between large numbers of first images and the third image can be achieved. The first images B1 are given by switching many two-dimensional images previously made by a computer or the like by using the above-mentioned spatial modulator in the coherence-decay time $T_2$. Each image is incident into the crystal 1 by a pulse in the pulse train constituting the first beam B1 as shown in FIG. 6, and the data entering the crystal 1 are stored in the form of a spatial Fourier transformed pattern. By entering the third image B3 to the crystal 1 as shown in FIG. 7, the Fourier transformed pattern is converted back to temporal echo pulses be which represent the correlation images between the first images B1 and the third image B3.

Echo images thus obtained are recorded with the optical detector 20.

FIGS. 8A–8E show the stimulated photon echo image processing results with five different experimental configurations.

FIG. 8A is a reproduction of the first image B1 with plane wave inputs of second and third beams B2 and B3.

FIG. 8B is an image convolution case with one "x" and two dots yielding two "x"s.

FIGS. 8C–8E are correlation operations between the first image B1 and the third image B3. When the first image B1 rotates by 90 degrees as shown in FIG. 8E, so does the echo image Be. The haze around the echo dots are the second pulse leakage through the Pockels cell 21. The dots in the first image are typically 5 mm apart. In some echo images, the edges are blocked by the 1 cm Pockels cell aperture.

The experiments shown in FIGS. 8A–8E indicates that clear photon echo images can be obtained.

Although the experiments are performed between two images, a number of first images or second images can be used as reference images by using a spatial light modulator for switching the first or second images and by using a pulse train as the first beam B1 or the second beam B2. The number of reference images is determined by the ratio of the inhomogeneous broadening to the homogeneous broadening of the rare earth ion, and is typically $10^5$ as described above. Thus, spatial convolution and correlation of input images can be performed on a nanosecond time scale.

INDUSTRIAL APPLICABILITY

According to the invention, spatial convolution and correlation of the input images in nanosecond time scale are performed by combining the nanosecond processing capability with the ultrafast high intensity storage potential of the stimulated photon echo medium. Thus, the present invention can be applied to two-dimensional image processing and pattern recognition which are required, for instance, in robotic vision, satellite remote sensing, medical image analysis, and artificial intelligence.

While the present invention has been described in detail with respect to preferred embodiments, it will be understood that numerous modifications, changes, variations and equivalents will be made by those skilled in the art without departing from the spirit and scope of the invention.

Accordingly, it is intended that the invention herein be limited only by the scope of the appended claims.

What is claimed is:

1. An all optical image processing and pattern recognition apparatus using stimulated photon echoes comprising:

a stimulated photon echo medium having an inhomogeneous broadening line shape function;

first incident means for launching a first optical pulse into said photon echo medium;

second incident means for launching a second optical pulse train including two or more optical pulses into said photon echo medium from a direction different from the incident direction of said first optical pulse in the coherence-decay time of said photon echo medium after the incidence of said first optical pulse;

third incident means for launching a third optical pulse into said photon echo medium in the population-decay time of said photon echo medium after the incidence of said second optical pulse train, said population-decay time being defined as time during which said medium returns to its thermal equilibrium state from its excited state; and optical detecting means for detecting photon echoes emitted from said photon echo medium, wherein said second optical pulse train includes a plurality of pieces of image information.

2. An all optical image processing and pattern recognition apparatus using stimulated photon echoes as defined in claim 1 wherein said first optical pulse is a plane wave, said second optical pulse train consists of a plurality of optical pulses each including image information, and said third optical pulse includes a test image to be analyzed.

3. An all optical image processing and pattern recognition apparatus using stimulated photon echoes as defined in claim 1 wherein said photon echo medium is a rare earth ion doped dielectric crystal.

4. An all optical image processing and pattern recognition apparatus using stimulated photon echoes as defined in claim 1 wherein said photon echo medium is a rare earth ion doped crystal.

5. An all optical image processing and pattern recognition apparatus using stimulated photon echoes comprising:

a stimulated photon echo medium having an inhomogeneous broadening line shape function;

first incident means for launching a first optical pulse train including two or more optical pulses into said photon echo medium;

second incident means for launching a second optical pulse into said photon echo medium from a direction different from the incident direction of said first optical pulse train in the coherence-decay time of said photon echo medium after the incidence of said first optical pulse train;

third incident means for launching a third optical pulse into said photon echo medium in the population-decay time of said photon echo medium after the incidence of said second optical pulse, said population-decay time being defined as time during which said medium returns to its thermal equilibrium state from its excited state; and optical detecting means for detecting photon echoes emitted from said photon echo medium, wherein said first optical pulse train includes a plurality of pieces of image information.

6. An all optical image processing and pattern recognition apparatus using stimulated photon echoes as defined in claim 5 wherein said first optical pulse train consists of a plurality of optical pulses each including image information, said second optical pulse is a plane wave, and said third optical pulse includes a test image to be analyzed.

7. An all optical image processing and pattern recognition apparatus using stimulated photon echoes as defined in claim 5 wherein said photon echo medium is a rare earth ion doped dielectric crystal.

8. An all optical image processing and pattern recognition apparatus using stimulated photon echoes as defined in claim 5 wherein said photon echo medium is a rare earth ion doped crystal.

* * * * *